United States Patent
Bonanno

(10) Patent No.: US 6,412,394 B2
(45) Date of Patent: Jul. 2, 2002

(54) METHOD AND DEVICE FOR PREPARING ESPRESSO COFFEE

(75) Inventor: Francesco Bonanno, Gaggio Montano (IT)

(73) Assignee: Petroncini Impianti S.r.l., Modena (IT)

( * ) Notice: Subject to any disclaimer, the term of this patent is extended or adjusted under 35 U.S.C. 154(b) by 0 days.

(21) Appl. No.: 09/729,792

(22) Filed: Dec. 6, 2000

(30) Foreign Application Priority Data

Feb. 7, 2000 (IT) ........................................ BO2000A51

(51) Int. Cl.⁷ ............................................... A47J 31/06
(52) U.S. Cl. ....................... 99/299; 99/323.1; 426/433
(58) Field of Search ............................... 99/299, 323.1, 99/293, 295, 302 R; 426/433, 435

(56) References Cited

U.S. PATENT DOCUMENTS

| | | |
|---|---|---|
| 3,333,527 A | 8/1967 | Bender |
| 4,172,465 A | 10/1979 | Dashner |
| 4,882,982 A * | 11/1989 | Muttoni .................... 99/295 |
| 5,127,318 A * | 7/1992 | Selby, III ................. 99/299 X |
| 5,150,645 A * | 9/1992 | Schiettecatte ............. 99/299 X |
| 5,753,297 A | 5/1998 | Schmed |

FOREIGN PATENT DOCUMENTS

| | | |
|---|---|---|
| DE | 30 35 157 | 4/1982 |
| EP | 0 016 364 | 7/2000 |
| FR | 654 979 | 4/1929 |

* cited by examiner

*Primary Examiner*—Reginald L. Alexander
(74) *Attorney, Agent, or Firm*—Browdy and Neimark

(57) ABSTRACT

Espresso coffee or similar drinks in manual or automatic machines is prepared by causing a forced flow of boiling water to pass through a percolation chamber containing coffee powder, in which an adjustable back pressure is created in the percolation chamber to increase the time of contact between the powder and the water. The machine includes a percolation chamber traversed by hot water and intended to contain coffee powder, a drink exit conduit, in which the conduit is in the form of a nozzle having an outlet throttled by adjustable mechanism, and a downstream emulsifying chamber having an air inlet bore.

14 Claims, 2 Drawing Sheets

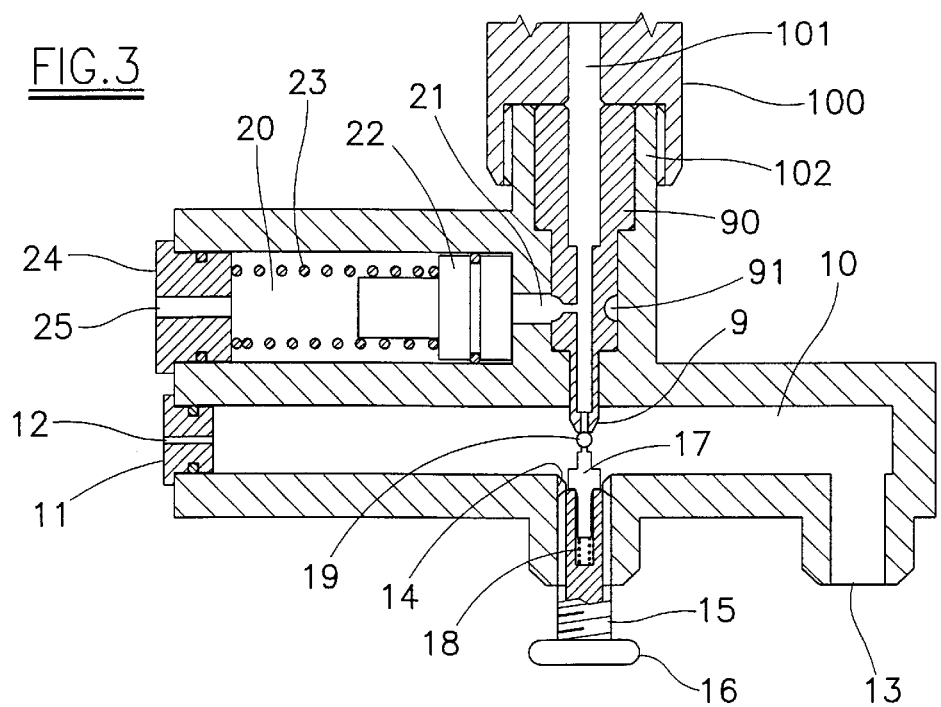
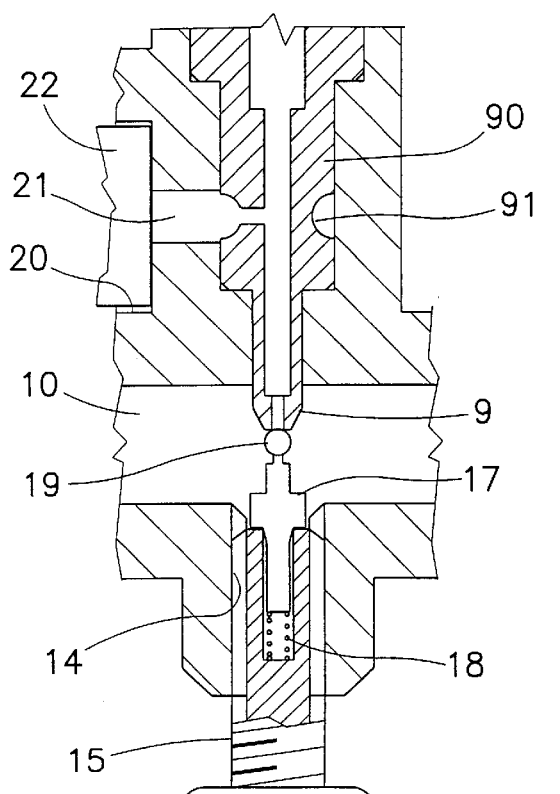
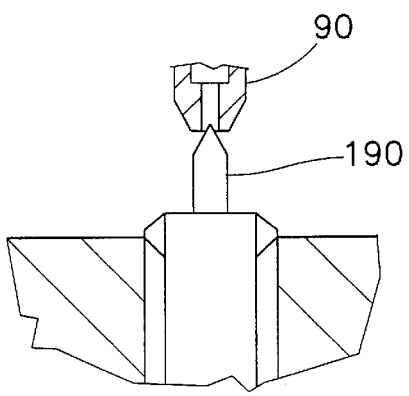

METHOD AND DEVICE FOR PREPARING ESPRESSO COFFEE

This invention relates to the preparation of espresso coffee, or Italian coffee, by percolating boiling water through a certain lightly pressed quantity of ground roasted coffee in powder form.

It is equally suitable for preparing espresso coffee starting from a single-measure or multi-measure coffee sachet formed of heat-resistant material able to act as a filter.

The invention is also suitable for preparing drinks from coffee substitutes, such as barley or the like.

Hereinafter, reference will be made exclusively to coffee, this term also embracing its substitutes.

Espresso coffee preparation machines for domestic or bar use comprise a hot water generator feeding a percolation chamber containing the coffee powder.

Said chamber commonly comprises the lower filtering wall, for example of perforated stainless steel, and is connected below a top piece through which the boiling water is fed.

Below the filtering wall there is defined a collection chamber for the percolated product which flows to the outside through a spout below which the cup is placed.

The quality of the product obtained depends both on the quality of the powder and on the ability of the operator, who has to press the powder to the correct extent to achieve uniform distribution of the percolating water through the entire coffee mass.

A commonly observed indicator in the user's judgement of the quality of the espresso coffee is the presence of froth, ie a creamy phase above the surface of the liquid phase.

The need to optimize the percolation stage, on which for equal powder quality the quality of the finished product depends, is obvious.

In the known art, in spite of full operator attention, there is a limit to the degree of utilization of the powder, as almost inevitably passages of lesser density form in the powder mass, creating preferential passageways for the hot water, which hence does not sufficiently traverse certain parts of the powder.

Said drawback is also present in automatic machines, in which the manner in which the powder is fed to the percolation chamber often does not ensure uniform water passage through the whole of the coffee powder.

The object of this invention is to propose and provide an espresso coffee preparation method and device which ensures maximum powder utilization and can be easily adapted for the use of any starting substance.

The invention is aimed at both manual machines and automatic machines.

The invention is primarily based on the fact of creating a back pressure of desired value which slows down the flow of the hot water, giving it time to expand throughout the entire mass of powder.

According to the invention, said back pressure is preferably associated with an emulsifying chamber positioned between the liquid exit nozzle and the coffee delivery spout, the liquid entering this chamber with certain speed to mix with the air and produce a creamy emulsion giving an enhanced appearance to the drink.

The method of the invention is implemented by devices easily associated with manual or automatic machines.

Said devices enable the object of the invention to be attained by virtue of the characteristics stated in the claims.

The constructional and functional characteristics of the invention will be apparent from the ensuing detailed description illustrating its various methods of implementation, given by way of non-limiting example with the aid of the figures of the accompanying drawings.

FIG. 3 shows an embodiment of the invention which can be easily associated with an automatic machine.

FIG. 4 is an enlarged detail of FIG. 3.

FIG. 5 shows a possible variant of FIG. 4.

FIG. 1 shows the top piece 1 of a normal espresso coffee preparation machine, to which the percolation chamber is fixed by the known bayonet connector 2.

Figure 1:
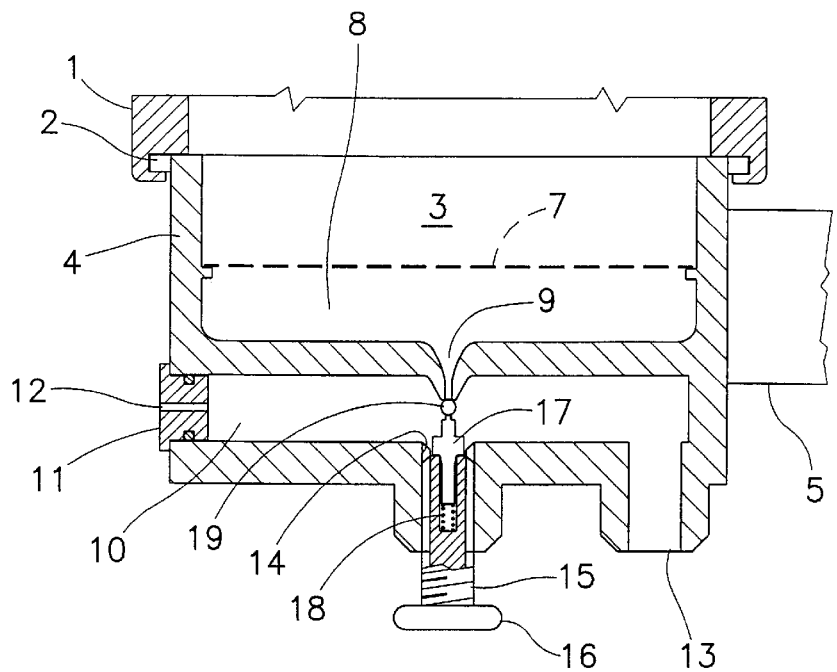
FIG. 1 is a partly sectional side view of a percolation chamber suitable for manual machines, in its most simple embodiment.

This chamber comprises a cup piece 4 provided with a handle 5 and defining a chamber 3 provided with a removable perforated wall 7.

The wall 7 bounds an underlying chamber 8 for collecting the percolated product, from which it emerges through the nozzle 9.

Below the nozzle 9 there is provided an emulsifying chamber 10 which is closed by a plug 11 axially bored at 12, and communicates with the spout 13 through which the drink is delivered to the cup.

The emulsifying chamber 10 comprises a threaded seat 14 coaxial with the nozzle 9, and into which a threaded member 15 provided with operating means 16 is screwed.

The member 15 is axially hollow to receive an axial pin 17 possibly by way of elastic means 18. The pin 17 is provided at its end with a nosepiece for closing the nozzle 9, which nosepiece can be an elastomeric ball 19 or a steel needle 190 (as in FIG. 5).

The nosepiece 19, 190 can be rested against the nozzle 9 and be kept pressed by the elastic means 18, or can be positioned at the desired distance from said nozzle by screwing the member 15 into its seat to a greater or lesser extent.

Figure 2:
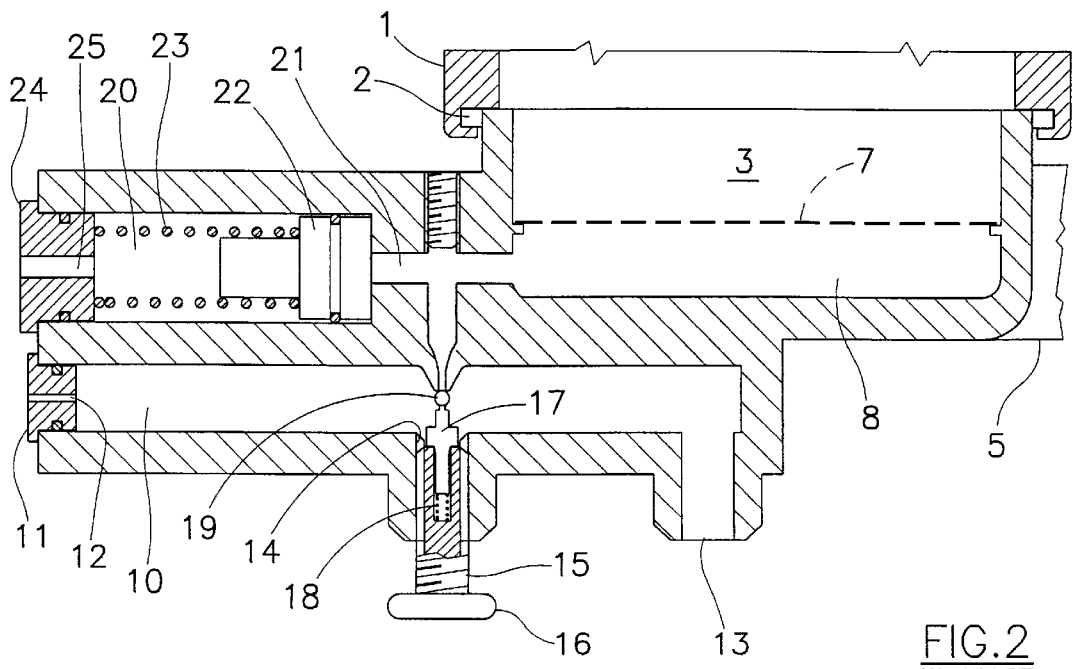
FIG. 2 shows an improved embodiment of the percolation chamber of FIG. 1.

FIG. 2 comprises all the means shown in FIG. 1, indicated by the same reference numerals.

The improved embodiment of FIG. 2 also comprises an expansion chamber 20 communicating with the duct of the nozzle 9 via a branch 21.

The chamber 20, of circular cross-section, comprises a sealed piston 22 maintained at that end close to the nozzle 9 by a spring 23 opposed by the plug 24. The plug 24 is bored at 25 and communicates with the outside.

FIGS. 3, 4 and 5 show executive details of the aforedescribed embodiments, suitable particularly but not exclusively for implementing the invention in automatic machines.

Those details of FIGS. 3 to 5 corresponding to the details of FIGS. 1 and 2 are indicated by the same reference numerals.

The reference numeral 100 indicates a portion of the body of the automatic espresso coffee preparation machine to which the invention is applied.

In the illustrated example said portion 100 comprises the hot water delivery duct 101, in front of which the piece 102 is fixed such that the axis of the nozzle 9 is aligned with 101.

This nozzle is provided within a bush 90 having an axial bore and a circular groove 91 positioned in front of the expansion chamber 20 and communicating with the axial bore of the nozzle 9 via a branch 21.

Below the nozzle 9 there is an emulsifying chamber 10 which is closed by a plug 11 bored axially at 12, and communicates with the drink delivery spout 13.

The emulsifying chamber 10 comprises a threaded seat 14 coaxial with the nozzle 9, and into which a threaded member 15 provided with operating means 16 is screwed.

The member 15 is axially hollow to receive an axial pin 17 possibly by way of elastic means 18. The pin 17 is provided at its end with a nosepiece in the form of an elastomeric ball 19 for closing the nozzle 9.

The ball 19 can be rested against the nozzle 9 and be kept pressed by the elastic means 18, or can be positioned at the desired distance from said nozzle by screwing the member 15 into its seat to a greater or lesser extent.

The same applies if a needle 190 is provided instead of the ball.

In the variant of FIG. 5, the throttling means for the nozzle 9 are in the form of a needle 190.

The invention operates in the following manner. The known procedure is used for coffee percolation.

According to the invention, by using the operating member 16 to adjust the thrust of the throttling element 19, 190 against the nozzle 9 or its distance from the nozzle 9, a back pressure is created in the percolation chamber 3 which increases the contact time between the hot water and the coffee powder, to ensure optimum utilization of this latter.

A drink is hence obtained of quality comparatively much better than that obtained with the known system, meaning that for equal coffee powder quality a better drink is obtained, or that for equal powder quality less powder can be used.

The final drink appearance is rich in cream in that in passing through the gap between the nosepiece 19 and the nozzle at great speed, the drink mixes with the air contained in the chamber 10, to emulsify and assume the enhanced creamy appearance which besides facilitating development of the aroma, gives quality to the drink.

Perfect execution of the process depends to a substantial extent on the diameter of the nozzle 9, which must be as small as possible compatible with the requirements of throughput and the risk of clogging.

The embodiment shown in FIGS. 2 and 4 considerably reduces the risk of clogging.

In this respect, during percolation, that portion of percolated liquid which initially descends and is the least rich in solid particles fills the chamber 20 by overcoming the elastic resistance of the piston 22, which moves towards the left to compress the spring 23.

When hot water feed is halted at the end of the process, the liquid contained in the chamber 22 is expelled through the nozzle 9 to clean it of any solid parts, while at the same time it acts below the perforated wall 7 to free any perforations clogged with coffee powder.

What is claimed is:

1. A device for preparing espresso coffee or similar drinks, comprising
    means for feeding hot water,
    a percolation chamber traversed by hot water and intended to contain coffee powder or coffee powder substitute, and
    a drink exit conduit,
    wherein the conduit is in the form of a nozzle, the outlet of which is throttled by adjustable means, and
    wherein the nozzle opens into an atmospheric pressure chamber which communicates with the outside and in which the liquid falling from a delivery spout is collected.

2. A device as claimed in claim 1, characterized in that said atmospheric pressure chamber comprises, coaxial with the nozzle, a threaded seat into which a member is screwed, said member being provided with externally located operating means and carrying said throttling means.

3. A device as claimed in claim 2, characterized in that the nozzle is formed within an axially bored bush comprising an outer circumferential groove communicating with the axial bore of the nozzle via a radial duct.

4. A device as claimed in claim 3, characterized in that said radial groove communicates with the expansion chamber.

5. A device for preparing espresso coffee or a similar drink, comprising
    a percolation chamber intended to contain coffee powder or powder of a coffee substitute, and adapted to receive hot water for passage therethrough of the hot water to brew a coffee drink,
    said percolation chamber having a coffee drink exit conduit in the form of a nozzle,
    an adjustable throttling mechanism located at said nozzle to restrict the flow of coffee drink therethrough, and
    an emulsifying chamber downstream from said nozzle and said adjustable throttling mechanism, said emulsifying chamber communicating with the outside through a bore,
    whereby coffee drink forced through said nozzle and throttled by said adjustable throttle mechanism is emulsified with air within said emulsifying chamber, fed with air from said bore.

6. A device as claimed in claim 5, in which said emulsifying chamber comprises, coaxial with the nozzle, a threaded seat into which a member is screwed, said member being provided with externally located operating means and carrying said throttling means.

7. A device as claimed in claim 6, in which said throttling means comprises a rubber nosepiece.

8. A device as claimed in claim 6, in which said throttling means comprises a needle-shaped pin.

9. A device as claimed in claim 5, further comprising an expansion chamber (20) communicating with the nozzle.

10. A device as claimed in claim 9, in which the expansion chamber is a cylindrical chamber open outwards at one end and containing a sealed piston (22) opposed by a spring (23).

11. A device as claimed in claim 9, in which the nozzle (9) is formed within an axially bored bush (90) comprising an outer circumferential groove (91) communicating with the axial bore of the nozzle (9) via a radial duct, and wherein said groove (91) also communicates with the expansion chamber.

12. A device for preparing espresso coffee or a similar drink, comprising
    a percolation chamber for supporting therewithin coffee powder or powder of a coffee substitute, said percolation chamber having a coffee drink exit conduit, said coffee drink exit conduit having an outlet,
    means for passing hot water to said percolation chamber, whereby a coffee drink is formed in said percolation chamber,
    an emulsifying chamber downstream of said coffee drink exit conduit,
    means for feeding air into said emulsifying chamber, comprising an air inlet bore extending directly between said emulsifying chamber and the exterior of said device, and
    an adjustable throttle at said nozzle outlet, whereby coffee drink emerging from said exit conduit into said emulsifying chamber is aerated by emulsification of said coffee drink with air passing through said bore into said emulsifying chamber.

13. A device for preparing espresso coffee or similar drinks, comprising means for feeding hot water, a percolation chamber traversed by hot water and intended to contain coffee powder or coffee powder substitute, and a drink exit conduit, wherein the conduit is in the form of a nozzle, the outlet of which is throttled by adjustable means, further comprising an expansion chamber communicating with the nozzle, wherein the expansion chamber is a cylindrical chamber open outwards at one end and containing a sealed piston opposed by a spring.

14. A method for preparing espresso coffee or a similar drink in a manual or automatic machine, comprising causing a forced flow of boiling water to pass into a percolation chamber containing coffee powder or powder of a coffee substitute, said percolation chamber having a coffee drink exit and a throttling device associated with said coffee drink exit, and passing said coffee drink through said coffee drink exit while simultaneously throttling liquid flow of said coffee drink at said coffee drink exit to emulsify said coffee drink with air in an emulsifying chamber located downstream from said coffee drink exit, said throttling being obtained by applying an adjustable back pressure to the percolation chamber, and permitting air to enter the emulsifying chamber from the outside while passing said coffee drink through said coffee drink exit.

* * * * *